(12) United States Patent  (10) Patent No.: US 11,935,010 B2
Ayloo  (45) Date of Patent: Mar. 19, 2024

(54) INTELLIGENT SUBJECT LINE SUGGESTIONS AND REFORMULATION

(71) Applicant: Microsoft Technology Licensing, LLC, Redmond, CA (US)

(72) Inventor: Kalyan Ayloo, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 16/671,122

(22) Filed: Oct. 31, 2019

(65) Prior Publication Data

US 2021/0133287 A1   May 6, 2021

(51) Int. Cl.
*G06F 17/00* (2019.01)
*G06F 18/2113* (2023.01)
(Continued)

(52) U.S. Cl.
CPC ....... *G06Q 10/107* (2013.01); *G06F 18/2113* (2023.01); *G06F 40/174* (2020.01);
(Continued)

(58) Field of Classification Search
CPC ...... G06F 40/279; G06F 40/274; G06F 40/10; G06F 40/166; G06F 40/174; G06F 40/186; G06F 40/258; G06F 40/20; G06F 18/2113; G06F 40/00; G06F 40/103; G06F 40/169; G06F 40/30; G06F 40/284; G06F 40/211; G06F 18/24; G06K 9/623; G06K 9/6227; G06K 9/6232; G06K 9/6267; G06Q 10/107; G06Q 10/10; G06Q 10/101; G06V 10/768; H04L 51/22; H04L 51/24; H04L 51/26; H04L 51/42; H04L 51/21; H04L 51/216; H04L 51/224; G06N 5/04; G06N 20/00; G06N 5/025

See application file for complete search history.

(56) References Cited

U.S. PATENT DOCUMENTS 8,645,430 B2  2/2014  Khouri et al.
9,092,742 B1  7/2015  Zeng et al.
(Continued)

FOREIGN PATENT DOCUMENTS

EP   3654258 A1 *  5/2020  ............. G06F 40/35

OTHER PUBLICATIONS

Zhang, Rui, and Joel Tetreault. "This email could save your life: Introducing the task of email subject line generation." arXiv preprint arXiv:1906.03497 (2019). (Year: 2019).*
(Continued)

*Primary Examiner* — Michael Ortiz-Sanchez

(57) ABSTRACT

Systems and methods directed to formulating and suggesting a subject line based on content of an email message are provided. More specifically, content corresponding to one or more portions of an email may be received, where the content may be utilized to determine one or more email topics and at least one intent of the email. An intent of the email may correspond to whether an action is to be performed, whether a question is presented, whether a request for time is present, and/or any other request on the part of the recipient or the sender. Based on the intent of the email and the one or more topics, a subject line suggestion may be formulated and presented to a user.

18 Claims, 14 Drawing Sheets

(51) Int. Cl.
  *G06F 40/174* (2020.01)
  *G06F 40/258* (2020.01)
  *G06F 40/274* (2020.01)
  *G06F 40/279* (2020.01)
  *G06Q 10/107* (2023.01)
  *H04L 51/42* (2022.01)
  *G06F 40/166* (2020.01)
  *G06F 40/186* (2020.01)
  *G06Q 10/10* (2023.01)

(52) U.S. Cl.
  CPC .......... *G06F 40/258* (2020.01); *G06F 40/274* (2020.01); *G06F 40/279* (2020.01); *H04L 51/42* (2022.05); *G06F 40/166* (2020.01); *G06F 40/186* (2020.01); *G06Q 10/10* (2013.01)

(56) References Cited

U.S. PATENT DOCUMENTS

| | | | |
|---|---|---|---|
| 9,331,965 | B2 | 5/2016 | Caskey et al. |
| 2005/0228790 | A1* | 10/2005 | Ronnewinkel .......... G06F 16/35 |
| 2007/0250576 | A1 | 10/2007 | Kumar et al. |
| 2009/0055481 | A1 | 2/2009 | Carmel et al. |
| 2009/0106650 | A1 | 4/2009 | Haynes et al. |
| 2011/0154221 | A1 | 6/2011 | Deluca et al. |
| 2012/0110432 | A1* | 5/2012 | Mei ....................... G06F 40/186 715/233 |
| 2013/0346511 | A1* | 12/2013 | Park ....................... G06Q 10/10 709/206 |
| 2014/0289344 | A1 | 9/2014 | Calhoun et al. |
| 2015/0058426 | A1 | 2/2015 | Caskey et al. |
| 2016/0196561 | A1* | 7/2016 | Iyer ....................... G06Q 50/01 705/304 |
| 2017/0177715 | A1* | 6/2017 | Chang ....................... G06N 5/04 |
| 2017/0295118 | A1* | 10/2017 | Kirk ....................... G06Q 10/107 |
| 2019/0197107 | A1* | 6/2019 | Lin ....................... G06N 3/0445 |
| 2020/0019609 | A1* | 1/2020 | Yu ....................... G06F 40/186 |
| 2020/0193380 | A1* | 6/2020 | Muthuswamy Sivaraman ............ G06Q 10/107 |
| 2021/0083998 | A1* | 3/2021 | Bastide ................. H04L 51/214 |

OTHER PUBLICATIONS

"International Search Report and the Written Opinion Issued in PCT Application No. PCT/US2020/054894", dated Dec. 15, 2020, 12 Pages.

* cited by examiner

INTELLIGENT SUBJECT LINE SUGGESTIONS AND REFORMULATION

BACKGROUND

Existing email applications and providers include features to assist and increase user productivity. An example of such a feature is in the form of a type ahead feature, where as a user begins to compose a word, phrase, or sentence, ghosted text representing a suggested set of letters, words, and/or phrases that complete the initial word, phrase, and/or sentence composition are presented to the user. As another example, a user may compose an email and an email application may provide a subject line suggestion upon initiating a send functionality. However, existing email application often lack advanced features for enhancing sender and recipient productivity.

It is with respect to these and other general considerations that embodiments have been described. Also, although relatively specific problems have been discussed, it should be understood that the embodiments should not be limited to solving the specific problems identified in the background.

SUMMARY

Subject lines in messages, such as email, are attention grabbers and as such they are important to conveying information through email. Accordingly, there is a need to provide intelligence based assistance to one or more users not only composing and/or replying to emails, but also users acting as the recipient. In accordance with some examples, a basic subject line may be suggested based on the content provided in an email composition form; in some examples, the subject line may be suggested based on an existing email thread utilizing one or more machine learning techniques. In some examples, rather than providing a once-size-fits-all email subject line recommendation, subject lines may be tailored and stylized with key elements that for example, highlight if there is "action required" by recipients; highlight if there is a deadline that recipients need to be aware of; highlight or make a user aware that a key attachment or link is being shared, for example, flight tickets, receipts, or links to important articles; and/or highlight key points and/or questions raised in the email. In accordance with some examples, intelligent subject lines may be suggested for each message, even if a message has an existing subject line based on thread history. In some instances, a suggested subject line may be based on the topic and attributes of the current message in addition or instead of the message thread history.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1:
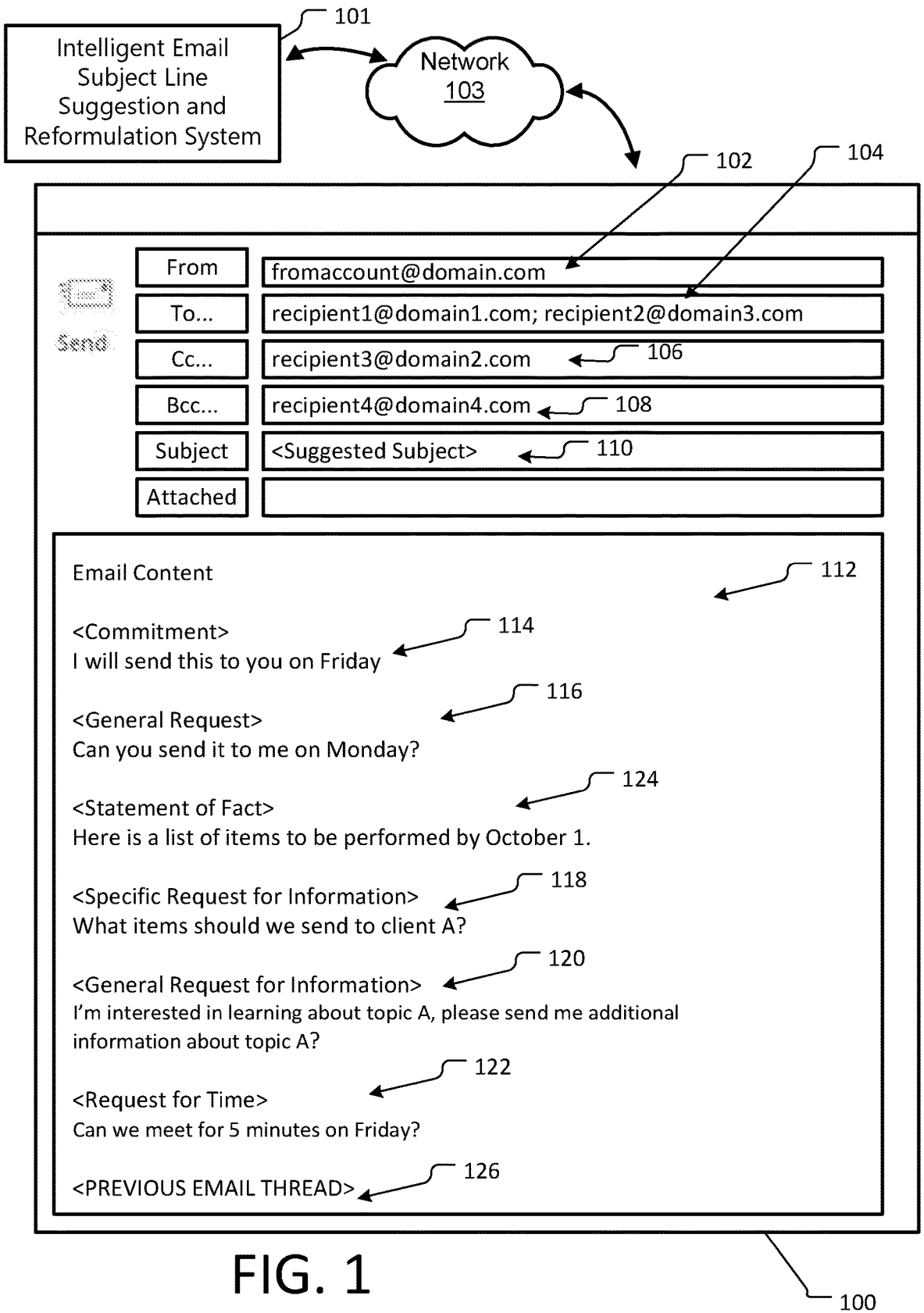
FIG. 1 illustrates one or more components of an intelligent email subject line suggestion and reformulation system together with email content in accordance with examples of the present disclosure.

FIG. 1 illustrates an example email composition window 100 in accordance with examples of the present disclosure. The email composition window 100 may generally be utilized by a user to compose an email, where a user may provide an address from which an email is sent in the sender field 102, one or more recipient addresses in a recipient field 104, one or more recipient addresses in the carbon copy field 106, one or more recipient addresses in the blind carbon copy field 108, and a subject in the subject line 110. The email composition window 100 may further include email content 112, where the email content 112 may include a portion of email content. The subject provided by the user in the subject line 110 may include a summary description of the portion of email content 112.

In accordance with examples of the present disclosure, an intelligent email subject line suggestion and reformulation system 101 may generate a subject in place of or otherwise to be included as part of a subject provided by a user in the subject line 110. More specifically, the intelligent email subject line suggestion and reformulation system 101 may provide a subject that is based on one or more portions of email content 112. In some examples, the one or more portions of email content 112 may correspond to one or more characteristics identified in the email, such as but not limited to a commitment 114 by a user, a general request 116, a statement of fact 124, a specific request for information 118, a general request for information 120, and/or a request for time 122. Of course, other characteristics may be determined by the intelligent email subject line suggestion and reformulation system 101 and may be utilized to formulate a subject for the subject line 110.

In accordance with examples of the present disclosure, the intelligent email subject line suggestion and reformulation system 101 may identify key topics of an email and/or email thread. For example, if an email is composed regarding a first topic, a machine learning technique may determine unique terms, or unique vocabulary, specific to this email. That is, common phrases, such as pleasantries and greetings like "Hi, how are you doing?", etc., may be identified and removed from the content of the email for purposes of determining one or more possible subjects. In some examples, the composed email may be compared against a universe of emails, the universe of emails being specific to the user composing the email, specific to a group of users, and/or relying on email composition information for a general population of users. Accordingly, commonly used phrases specific to the user, specific to the group, and/or specific to the general population of users may be removed; such commonly used phrases may be removed from the email content 112 to generate unique vocabulary specific to the email being composed. Accordingly, the unique terms, tokens, and/or vocabulary elements may be determined. Given the unique terms, tokens, and/or vocabulary elements for the email, a most likely subject is determined.

Figure 2:
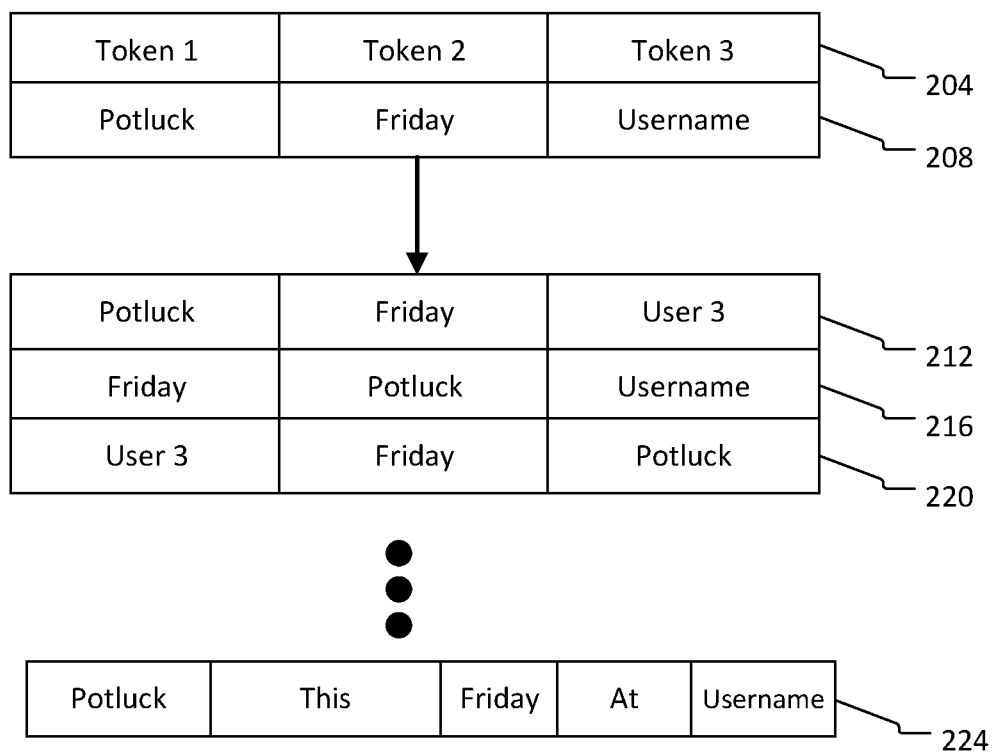
FIG. 2 illustrates one or more topic vectors in accordance with examples of the present disclosure.

FIG. 2 depicts an example of subject line formulation in accordance with examples of the present disclosure. More specifically, a machine learning model may be employed to compose a subject based on the remaining unique terms 204 determined in the email. As one example, the unique terms 208 for a specific non-limiting example may include "Potluck," "Friday," and "User 3". A first vector 212 may include a first combination of the unique terms, a second vector 216 may include a second combination of unique terms, a third vector 220 may include a third combination of key terms, etc. Each vector may then be scored against possible email subjects determine from the user's inbox and/or other users' inbox across an organization or corpus of user information. Accordingly, a vector 224 for example, having the highest score may be indicated as the most likely subject line. As depicted in FIG. 2, based on the other possible email subjects, additional linking terms, such as "this" and "at" may be added to a vector; such linking terms may be generated by the intelligent email subject line suggestion and reformulation system 101 and may be based on one or more natural language processing techniques, such as but not limited to tagging parts of speech, shallow parsing and/or chunking, constituency parsing, and dependency parsing. Of course, other natural language processing techniques may be employed to generate a subject based on the identified one or more tokens.

In accordance with some examples of the present disclosure, the intelligent email subject line suggestion and reformulation system 101 may generate a subject based on one or more intents identified within the email content 112. For example, in addition to forming a subject line, or a portion of a subject line based on a most likely combination of unique terms, the subject line may also include information specific to one or more actions, such as but not limited to a request, question, and/or request for time commitment included in the email content 112. That is, email content 112 may include a commitment 114, for example, "I will send this to you on Friday." As another example, the email content 112 may include one or more general requests 116, for example, "Can you send it to me on Monday?" As another example, the email content 112 may include one or more specific requests for information 118, such as "What items should we send to client A?" As another example, the email content 112 may include a general request for information 120, such as "I'm interested in learning about topic A, please send me additional information about topic A." As another example, the email content 112 may include a request for time, such as "Can we meet for 5 minutes on Friday?" Of course, email content 112 may include content that is classified as a statement 122, such as "Here is a list of items to be performed by October 1."

At least one non-limiting example for determining an intent may include vectorizing one or more portions of the email content and analyzing such portions with an intent classifier. The intent classifier may compare a vectorized portion of content with one or more known intents and/or actions. The classifier may rely upon any of a number of known approaches including but not limited to generalized linear models, support vector machines, nearest neighbors, decision trees and neural networks. In some examples, an intent classifier vectorizes a portion of the email content and may perform a nearest neighbor algorithm comparison between the vectorized portion of email content and the one or more known intents. In some examples, a nearest neighbor vector identifies the intent.

Some intents may be are responsive to objects in the portion of email content. Accordingly, an object classifier may be utilized to identify an object. The object classifier may work in the same or similar manner as the intent classifier. The classifier may rely upon any of a number of machine learning approaches including but not limited to any known generalized linear models, support vector machines, nearest neighbors, decision trees and neural networks. The object classifier may vectorize one or more object attributes which may include but is not limited to parsing the one or more portions of email content into parts of speech, extracting nouns or verbs, and matching to stored object data. In at least one non-limiting example, the object classifier may determine the nearest match, by running a nearest neighbor algorithm comparison; the nearest neighbor may identify one or more objects that will be used as an object in the intent.

Accordingly, based on one or more of the identified intents, such as an identified action and/or statement in the email content 112, one or more templates for use may be determined and a subject line 110 may be suggested and may include elements or objects from the one or more identified actions and/or statements in the email content 112.

Figure 3A:
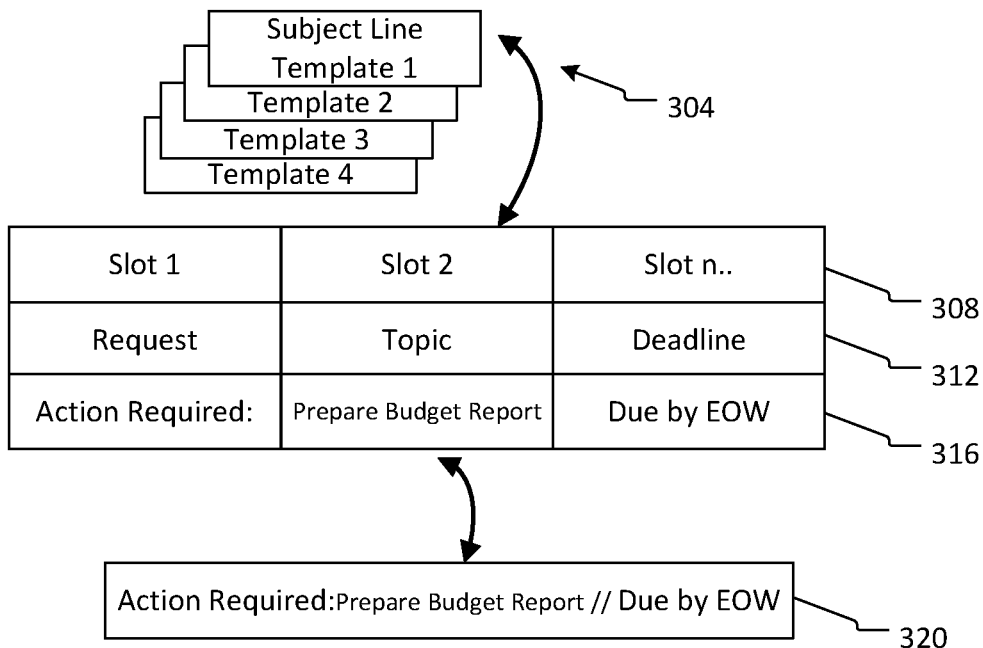
FIG. 3A illustrates a first example of a template utilized to formulate an email subject line suggestion in accordance with examples of the present disclosure.

For example, a template may be defined and/or customized to a user, organization, or otherwise, and may include one or more slots that are to be filled based on the template and the information pertaining to an identified intent. As depicted in FIG. 3A, one or more templates 304 may be matched to an identified request; for example, a first template 304 which may include the plurality of slots 308 associated with a request, topic, and deadline 312. In some examples, the intelligent email subject line suggestion and reformulation system 101 may identify information 316 to fill in or otherwise be placed into the one or more slots 308/312. Accordingly, the intelligent email subject line suggestion and reformulation system 101 may generate a subject 320 corresponding to at least on intent identified in the email content 112.

Figure 3B:
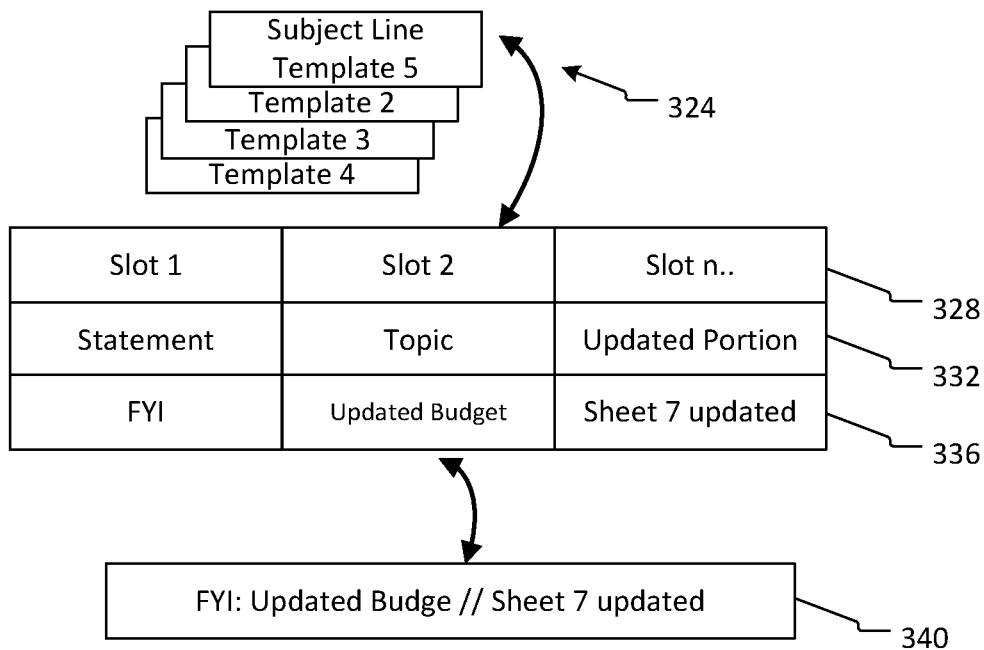
FIG. 3B illustrates a second example of a template utilized to formulate an email subject line suggestion in accordance with examples of the present disclosure.

As another example depicted in FIG. 3B, one or more templates 324 may be matched to an identified request; for example, a fifth template 324 which may include the plurality of slots 328 associated with a statement, topic, and specific portion 332 specific to the topic. In some examples, the intelligent email subject line suggestion and reformulation system 101 may identify information 336 to fill in or otherwise be placed into the one or more slots 332/328. Accordingly, the intelligent email subject line suggestion and reformulation system 101 may generate a subject 340 corresponding to at least on intent identified in the email content 112.

Figure 3C:
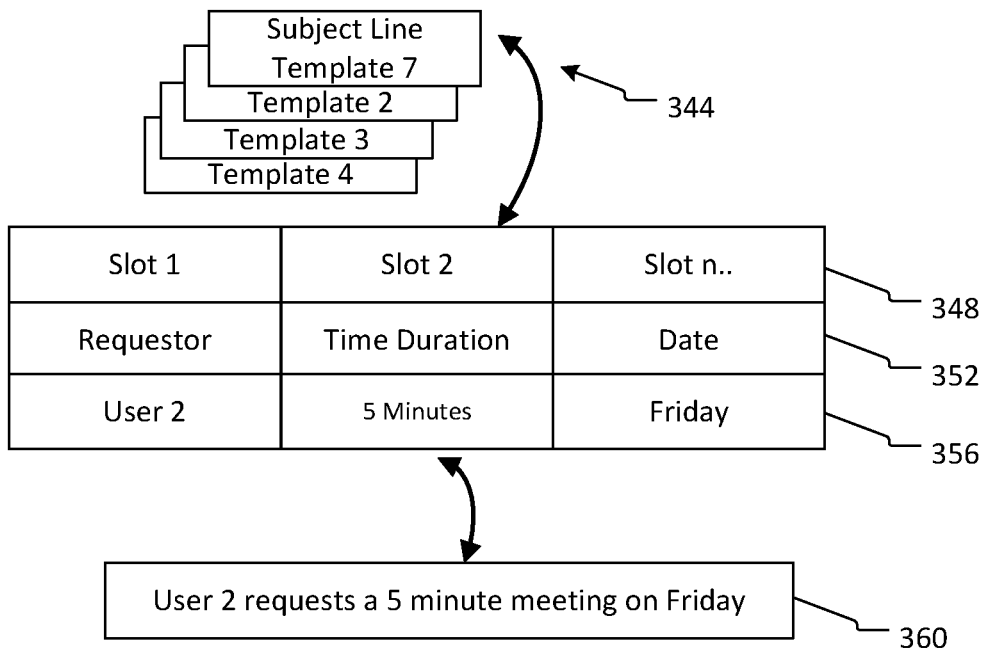
FIG. 3C illustrates a third example of a template utilized to formulate an email subject line suggestion in accordance with examples of the present disclosure.

As another example depicted in FIG. 3C, one or more templates 344 may be matched to an identified request; for example, a seventh template 344 which may include the plurality of slots 348 associated with a request for time which includes a requestor, time duration, and date 352. In some examples, the intelligent email subject line suggestion and reformulation system 101 may identify information 356 to fill in or otherwise be placed into the one or more slots 352/348. Accordingly, the intelligent email subject line suggestion and reformulation system 101 may generate a subject 360 corresponding to at least on intent identified in the email content 112.

Figure 3D:
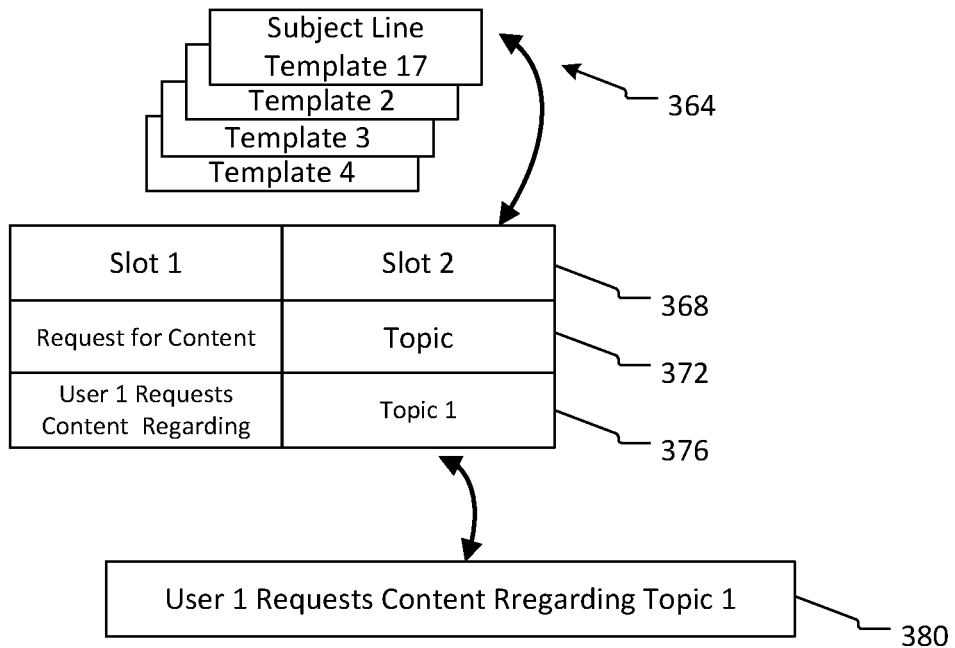
FIG. 3D illustrates a fourth example of a template utilized to formulate an email subject line suggestion in accordance with examples of the present disclosure.

As another example depicted in FIG. 3D, one or more templates 364 may be matched to an identified request; for example, a seventeenth template 364 which may include the plurality of slots 368 associated with a request for content and topic 372. In some examples, the intelligent email subject line suggestion and reformulation system 101 may identify information 376 to fill in or otherwise be placed into the one or more slots 372/368. Accordingly, the intelligent email subject line suggestion and reformulation system 101 may generate a subject 380 corresponding to at least on intent identified in the email content 112.

Figure 4:
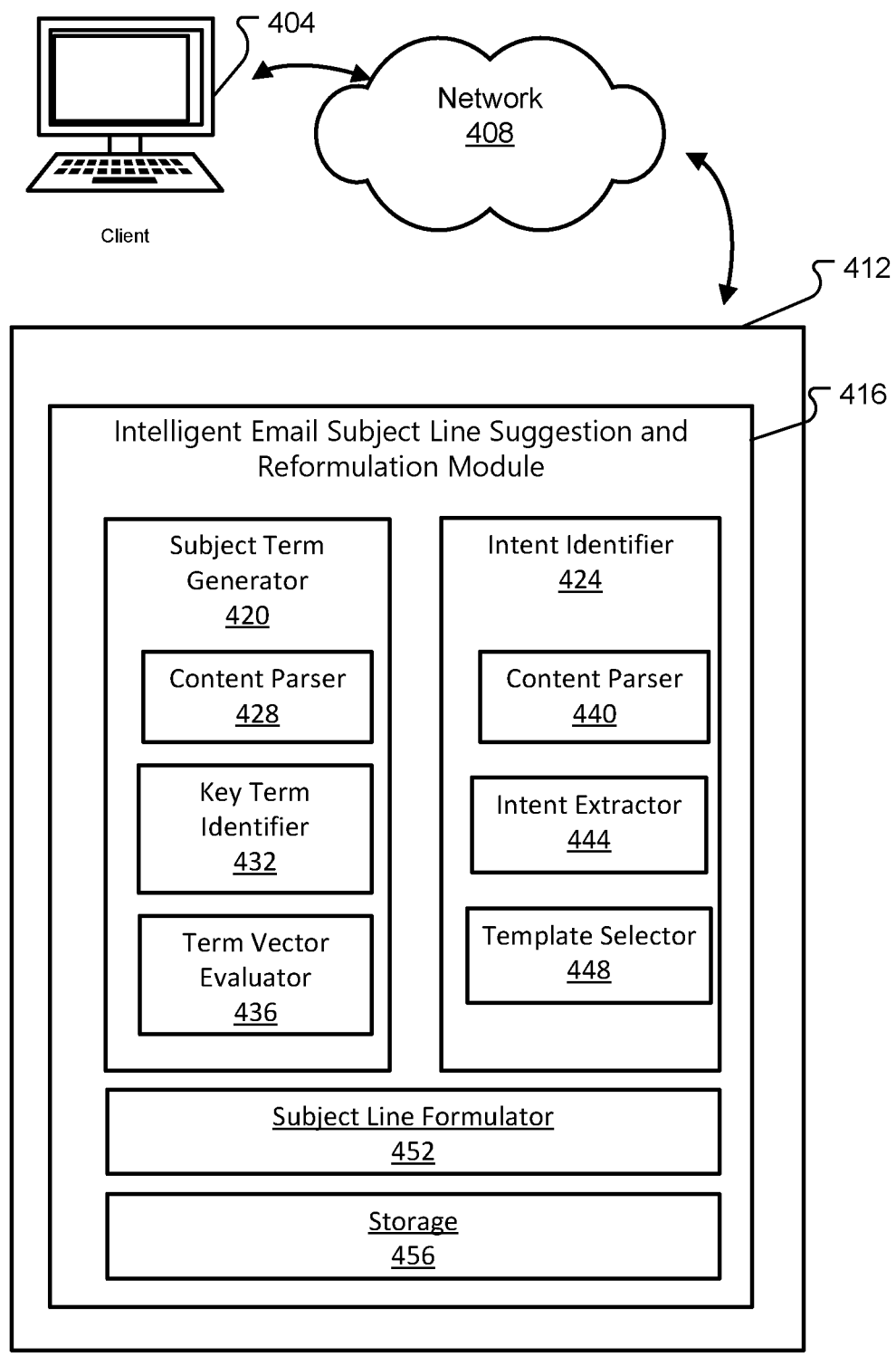
FIG. 4 illustrates details of an intelligent email subject line suggestion and reformulation module in accordance with examples of the present disclosure.

As depicted in FIG. 4, the intelligent email subject line suggestion and reformulation system 412, which may be the same as or similar to the intelligent email subject line suggestion and reformulation system 101, and may include an intelligent email subject line suggestion and reformulation module 416 which may generate a proposed subject and/or cause to be displayed to a user the proposed subject to a display for a user. The intelligent email subject line suggestion and reformulation system 412 may include a subject term generator 420, an intent identifier 424, a subject line formulator 452, and storage 456. The subject term generator 420 may be utilized to generate one or more vectors, such as vectors 212-220 for example. In some examples, the subject term generator 420 may include a content parser 428, key term identifier 432, and the term vector evaluator 436. The content parser may receive email content, such as email content 112 and parse such content to identify one or more characteristics of the email content 112. For example, at least one characteristic may be indicative of an existing thread in the email content 112. As another example, and in instances where email content corresponds to email content of the entire email message, the at least one characteristic may be indicative of an existing subject field and/or a recipient field. The key term identifier 432 may utilize content provided by the content parser 428 and remove content that is determined to be common to previous emails composed by the user and/or previous emails associated with a corpus of email content. The key term identifier 432 may then provide the key terms to the term vector evaluator 436, where the term vector evaluator may score differing combinations, including ordered combinations and combinations including additional linking words, to identify a highest scored vector. The highest scored vector may then be provided to the subject line formulator 452.

In some examples, the intent identifier 424 may include a content parser 440, an intent extractor 444, and a template selector 448. The intent identifier 424 may be utilized to determine an intent of the email content, for example, email content 112. An intent of email content may include but is not limited to an action, a request for information, a request for time, a statement, a commitment, a specific or general request for information, etc. The content parser 440 may receive email content, such as email content 112 and parse such content to identify one or more characteristics of the email content 112 and/or mark one or more portions of the email content indicative of or otherwise seeming to express an intent. For example, at least one characteristic may be indicative of a new sentence, phrase, and/or word which may indicate the beginning of a portion of the email content that includes the intent. As another example, the at least one characteristic may be indicative of a question, statement, exclamation, or the attachment of a document and/or file. As another example, an intent and/or object may be determined in a manner described above utilizing one or more machine learning approaches.

The intent extractor 444 may evaluate one or more portions of email content provided by the content parser 440 and extract an intent from such portions. In some examples, one or more machine learning approaches described above may be utilized. In some examples, one or more natural language processing techniques may be utilized to identify an intent of the one or more portions of email content. Based on the determined intent, a template, such as one or more of the previously described templates including, but not limited to templates 304, 324, 344, and 364, may be selected. One or more of the templates may be specific to a user, and organization, and/or other grouping of users. The template selector 448 may further populate one or more slots of the template as previously described. In some instances, the subject line formulator 452 may utilize the selected template to formulate a suggested subject line. In some instances, the subject line formulator 452 may utilize one or more terms from the subject term generator together with the selected template to formulate a suggested subject line. In accordance with examples of the present disclosure, the storage 456 may store the formulated subject line, one or more of the term vectors, the email content 112, one or more extracted intents, and/or one or more of the templates, selected or otherwise.

In some examples, an email composed by a user may have multiple intents, for example multiple factual statements and/or one or more commitments. In such instances, each of the intents may be identified, ranked, and one or more of the multiple intents may be selected based on which intent has been statistically determined to be most appropriate. In some examples, the multiple intents may indicate that a subject line is to be generalized to accommodate the multiple intents. For example, where an email composed by a user includes three factual statements, such as "first portion of budget FY20," "second portion of budget FY20," and "third portion of budge FY20," the subject line suggestion may be generalized to "info for budget FY20" for example, where the common element or objet of budget and/or FY20 is identified and the first portion, second portion, and third portion belong to a same category or otherwise classified as being the same or similar.

In some examples, a type of intent may take precedence over another type of intent. For example, where an email portion includes a request and a commitment, the subject line suggestion may include the request instead of the commitment. In some examples, an email portion may include three facts and one request; in such an instance, the request may take precedence and may be included in the suggested subject line instead of the three facts. As previously described, the determination and/or selection of which intent and/or object should be included in a suggested subject line may be based on heuristics and/or user preference.

In some examples, the subject line formulator 452 may preserve a conversation identifier associated with the email content. For example, in an instant where a user replies to an existing email or email thread, the subject of the email thread may be modified or replaced by the subject line formulator 452; however, in order to preserve the email thread, or conversation, where threads, or conversations, may be grouped by a common subject line, the intelligent email subject line suggestion and reformulation system 412 may preserve a conversation identifier, in metadata for example, and the conversation identifier may be included as part of the email message.

Figure 5:
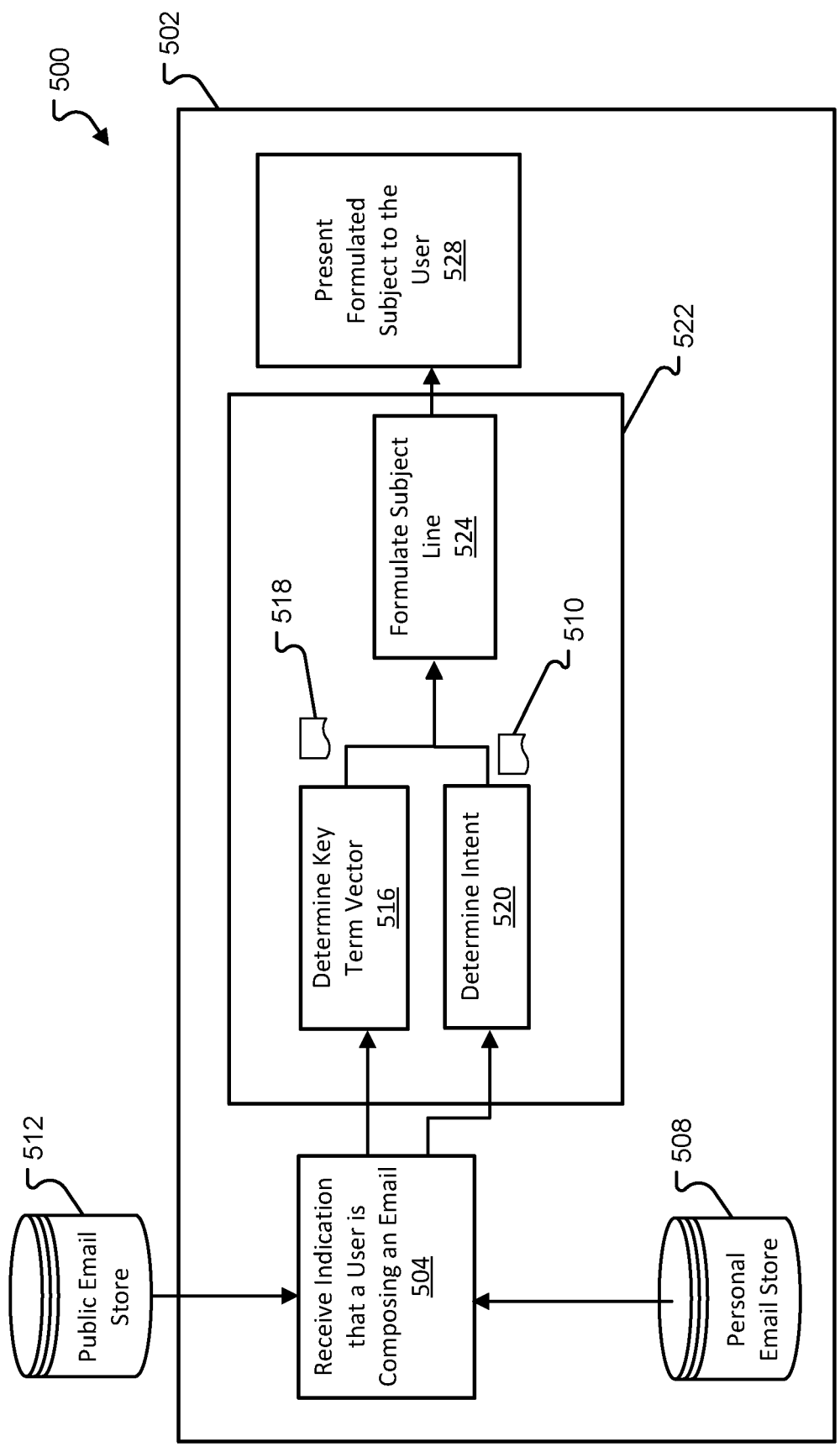
FIG. 5 illustrates details of a system for formulating and suggesting one or more subject lines in accordance with examples of the present disclosure.

FIG. 5 depicts an example system 500 for formulating and suggesting an email subject line in accordance with examples of the present disclosure. More specifically, the system 500 may include an email subject line suggestion and reformulation system 502 which may be the same as or similar to the email subject line suggestion and reformulation system 412 previously described. An indication that a user is composing an email may be received at 504, where such indication may correspond to email content, or a portion of email content, being received in an email composition window, such as the email composition window 100. In some examples, the indication received at 504 may correspond to a user selecting a send email option, button, and/or control and/or correspond to a period of inactivity, wherein the period of inactivity may correspond to a period of inactivity in the email composition window 100 for example. Utilizing a personal email store 508 for example, the email content, or portion of email content, may be compared to emails previously composed by the user to determine common portions of email content that can be removed from the email content, or portion of email content. In addition, a key term vector may be generated as previously described and may rely on key terms of the email content, or portion of email content, remaining after common portions have been removed and/or a corpus of email, such as public email store 512, utilized to score and rank on or more key term vectors. Accordingly, at 516, the term vector having a highest score for instance, may be generated as 518.

In some examples, and at 520, the email content, or portion of email content, may be parsed such that an intent of the email content, or portion of email content may be determined. For example, the email content, or portion of email content, may include a question or action and such question or action may be considered an "intent" of the email and may be extracted at 520 yielding an intent 510. In some examples, the intent may be utilized to select a template and the key term vector 518 may be utilized to populate at least a portion of the template—that is, one or more slots may be populated utilizing one or more key terms from the key term vector 518.

Based on the one or more key terms in the key term vector 518 and based on the intent 510, a subject line may be formulated. At 528, the subject line 110 for example of the email composition window 100 may be populated utilizing the formulated subject line. In some examples, the formulated subject line may be presented to a user prior to the formulated subject line being provided to or otherwise presented at the subject line 110 of the email composition window 100. For example, a user may be able to select the formulated subject line or deny the use of the formulated subject line; a selected formulated subject line may be presented in the subject line 110 whereas denying the formulated subject line may cause a subject line, if present, to remain in the subject line 110. As depicted in FIG. 5, the portions within the area 522 may be performed by one or more machine learning approaches discussed above; that is, 522 may be a machine learning model trained to suggest one or more subject lines, where such model may be trained for one or more users and/or one or more organizations. In some cases, the model is consistently retrained based on the acceptance and/or denial of a suggested subject line.

Figure 6:
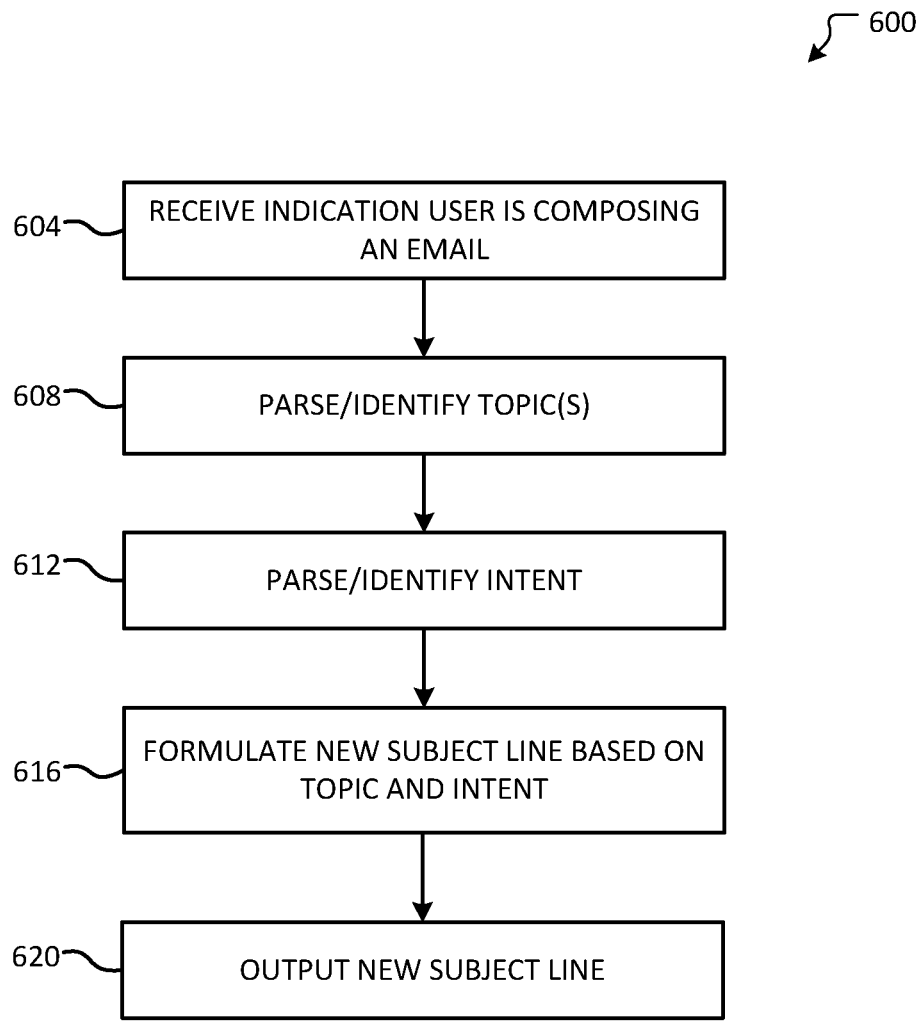
FIG. 6 illustrates a first method in accordance with examples of the present disclosure.

FIG. 6 depicts details of a method 600 for suggesting and formulating an intelligent subject line in accordance with examples of the present disclosure. A general order for the steps of the method 600 is shown in FIG. 6. Generally, the method 600 starts at 604 and ends at 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method 600 starts at 604, where an indication that a user is composing an email is received. For example, an indication that a user selected a send email option, command, button or otherwise may be received and/or an indication may be received corresponding to a period of inactivity. Based on the received indication, the method may proceed to 608 where email content, or a portion of email content, may be parsed to identify one or more topics of the email content and/or portion of email content. Based on the one or more topics, a topic vector may be determined as previously described. The method 600 may proceed to 612 where an intent of the email may be identified. For example, the intent may correspond to an action, a request for content, request for specific content, a question, and/or a request for time. While 608 is depicted as occurring before 612, it should be understood that 608 may be performed after 612 or in parallel with 612. The method 600 may then flow to 616 where a new subject line may be formulated based on the previously identified topic vector and the identified, or determined, intent. For example, and as previously described, a template may be selected based on intent; such template may be populated utilizing one or more of the topic vectors of 608 for example. At 616, one or more slots of the template may be filled with one or more words or combination of words present in the topic vector. The method 600 may then proceed to 620, where the newly formulated subject line may be presented to the user. I should be understood that as a user adds additional content to the email content and/or portions of email content, the method 600 may be executed multiple times. Accordingly, at a first time, a first newly formulated subject may be presented to a user. At a second time, a second newly formulated subject may be presented to the user. Accordingly, the method 600 may execute in real-time and/or in near real-time.

Figure 7:
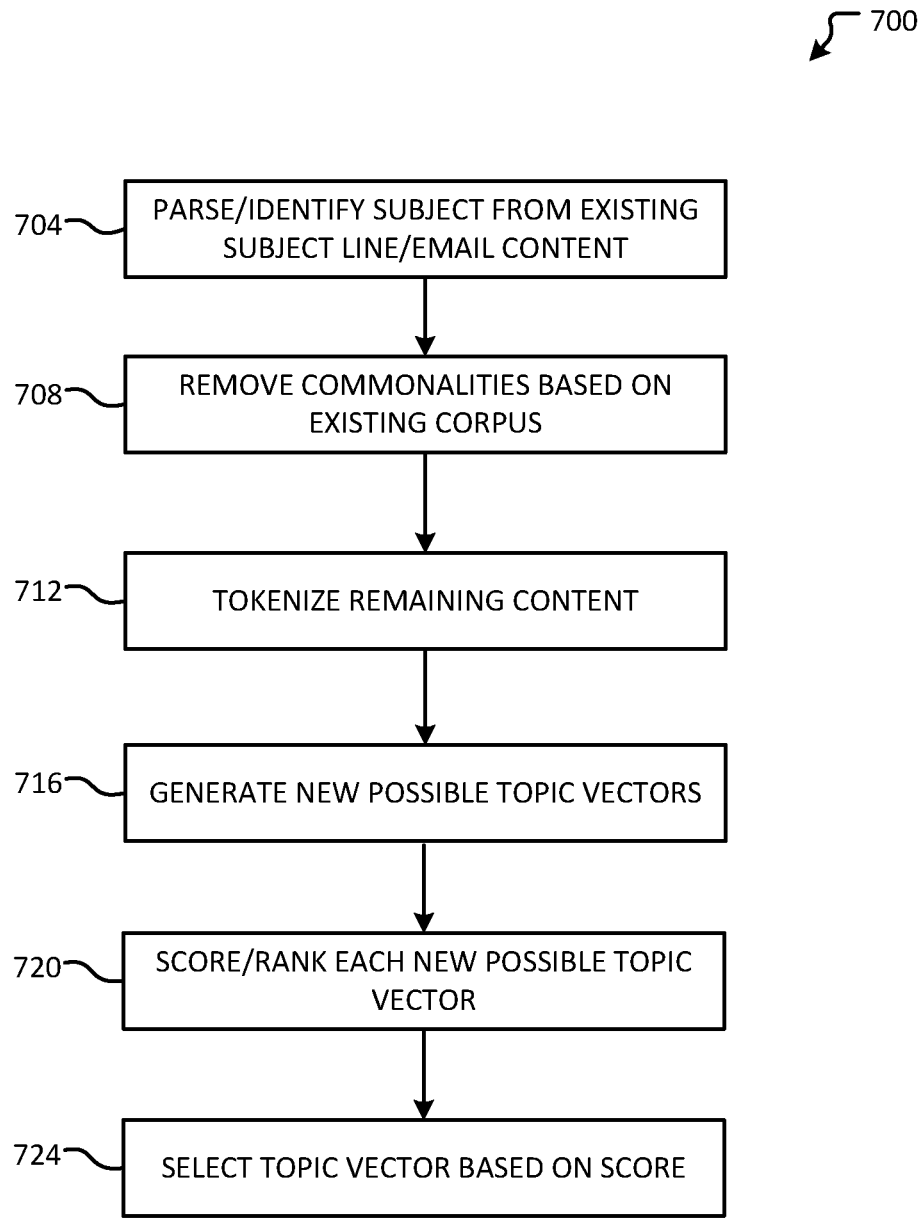
FIG. 7 illustrates a second method in accordance with examples of the present disclosure.

FIG. 7 depicts details of a method 700 for identifying and/or determining possible topic vectors in accordance with examples of the present disclosure. A general order for the steps of the method 700 is shown in FIG. 7. Generally, the method 700 starts at 704 and ends at 724. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method 700 starts at 704, where email content may be received. A portion of email content may correspond to the email content 112 and/or content of the subject line 110. At 708, commonalities between the email content received at 704 and email content corresponding to an existing corpus of email may be determined and such commonalities may be removed, leaving unique vocabulary and/or topic content. The existing corpus of email may correspond to a personal email store where user composed emails may be utilized as a source of identifying common expressions and common vocabulary used in prior email compositions. Alternatively, or in addition, the existing corpus of email may correspond to a public email store where emails composed from multiple users may be utilized as a source of identifying common expressions and common vocabulary. At 708, the common vocabulary and/or common expressions may be removed from the email content received at 704.

At 712, the remaining content may be tokenized and a plurality of topic vectors may be determined at 716 as previously described. At 720, each new possible topic vector may be scored utilizing an existing corpus of email content. In some examples, the existing corpus of email content may be the same as or similar to the existing corpus of email content utilized at 708. In some examples, the existing corpus of email content may be different from the existing corpus of email content utilized at 708. Based on the score of each topic vector, a topic vector representing a most likely ordering of topics may be selected. For example, the topic vector having a highest score may be selected. The selected topic vector may then be utilized to generate a new subject line, such as in 616 as previously described.

Figure 8:
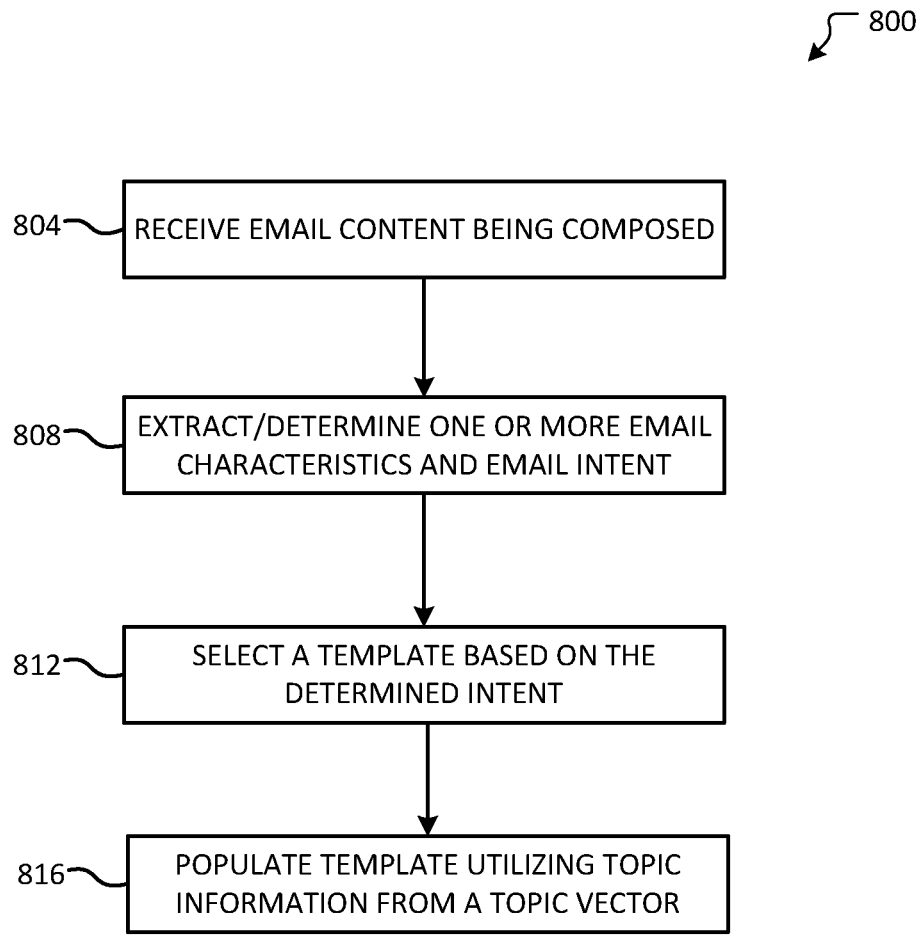
FIG. 8 illustrates a third method in accordance with examples of the present disclosure.

FIG. 8 depicts details of a method 800 for determining an intent from email content in accordance with examples of the present disclosure. A general order for the steps of the method 800 is shown in FIG. 8. Generally, the method 800 starts at 804 and ends at 816. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7.

The method 800 starts at 804, where email content may be received. The email content may correspond to a portion of email content 112, content of the subject line 110, and/or content of one or more fields described with respect to FIG. 1. At 808, one or more characteristics of the email may be extracted and/or determined. For example, a portion of the email content 112 may indicate that an action is required on the part of the email sender (user composing the email). Accordingly, a characteristic may indicate that an action is to be performed; accordingly, an intent of the email may be to provide the recipient with an action. As another example, email content 112 may indicate that a question is being presented to an email recipient. Accordingly, a characteristic of the email may indicate that an intent of the email is to present a question.

Figure 9:
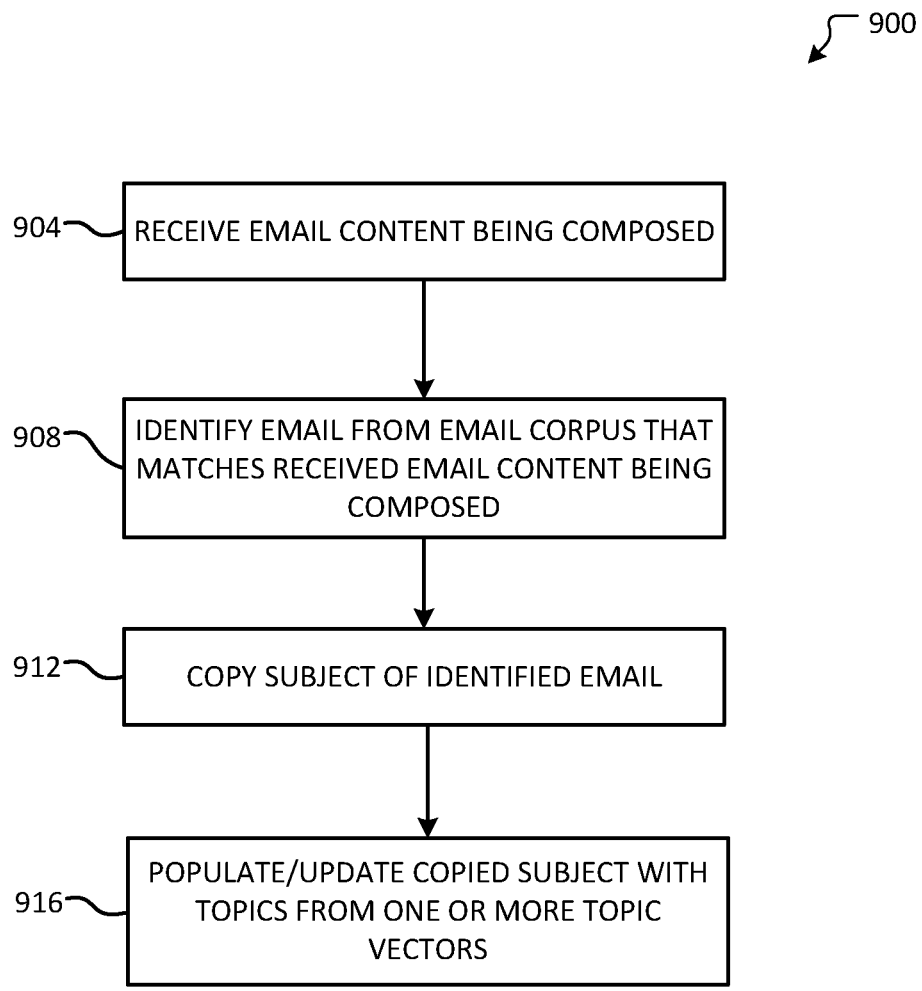
FIG. 9 illustrates a fourth method in accordance with examples of the present disclosure.

FIG. 9 depicts details of another method 900 for providing an email subject line suggestion. A general order for the steps of the method 900 is shown in FIG. 9. Generally, the method 900 starts at 904 and ends at 916. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1-8.

The method 900 starts at 904, where email content may be received. The email content may correspond to a portion of the email content 112, content of the subject line 110, and/or content of one or more fields described with respect to FIG. 1. At 908, an email containing content that closely matches the received email content may be identified and/or determined at 908. For example, a user may have sent an email to a first recipient; where the email to the first recipient includes the same or similar information to be sent to a second separate recipient. Accordingly, the email sent to the first recipient may be determined/identified. At 912, the subject of the identified/determined email may be copied. That is, if the information going to the second recipient is substantially similar to the information going to the first recipient, the subject line of the email going to the first recipient may be utilized as a template, or base, for formulating the subject line. Accordingly, at 916, the copied subject line may be updated/populated utilizing one or more topics identified from a topic vector as previously described.

Figure 10:
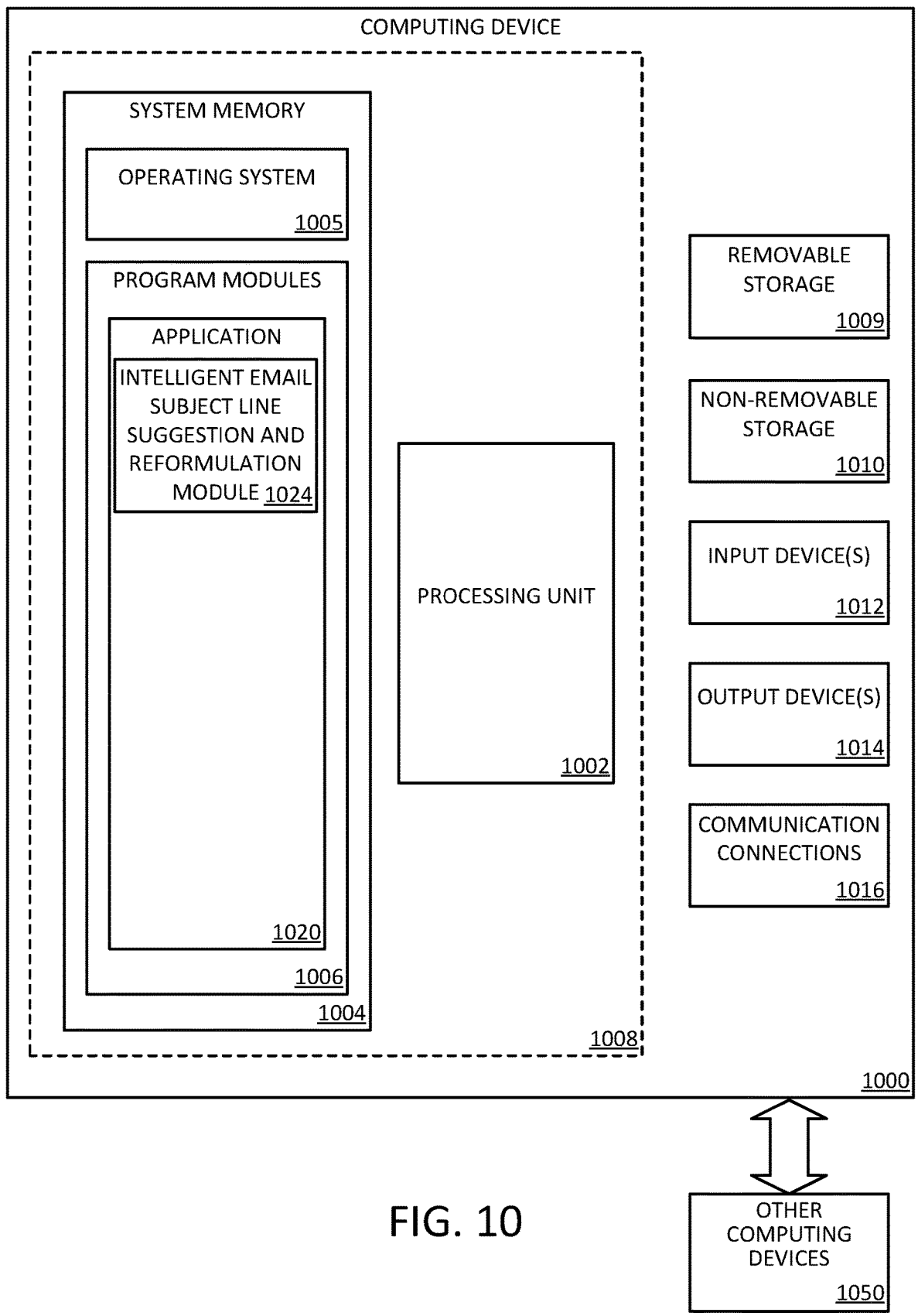
FIG. 10 is a block diagram illustrating example physical components of a computing device with which aspects of the disclosure may be practiced.
Figure 11A:
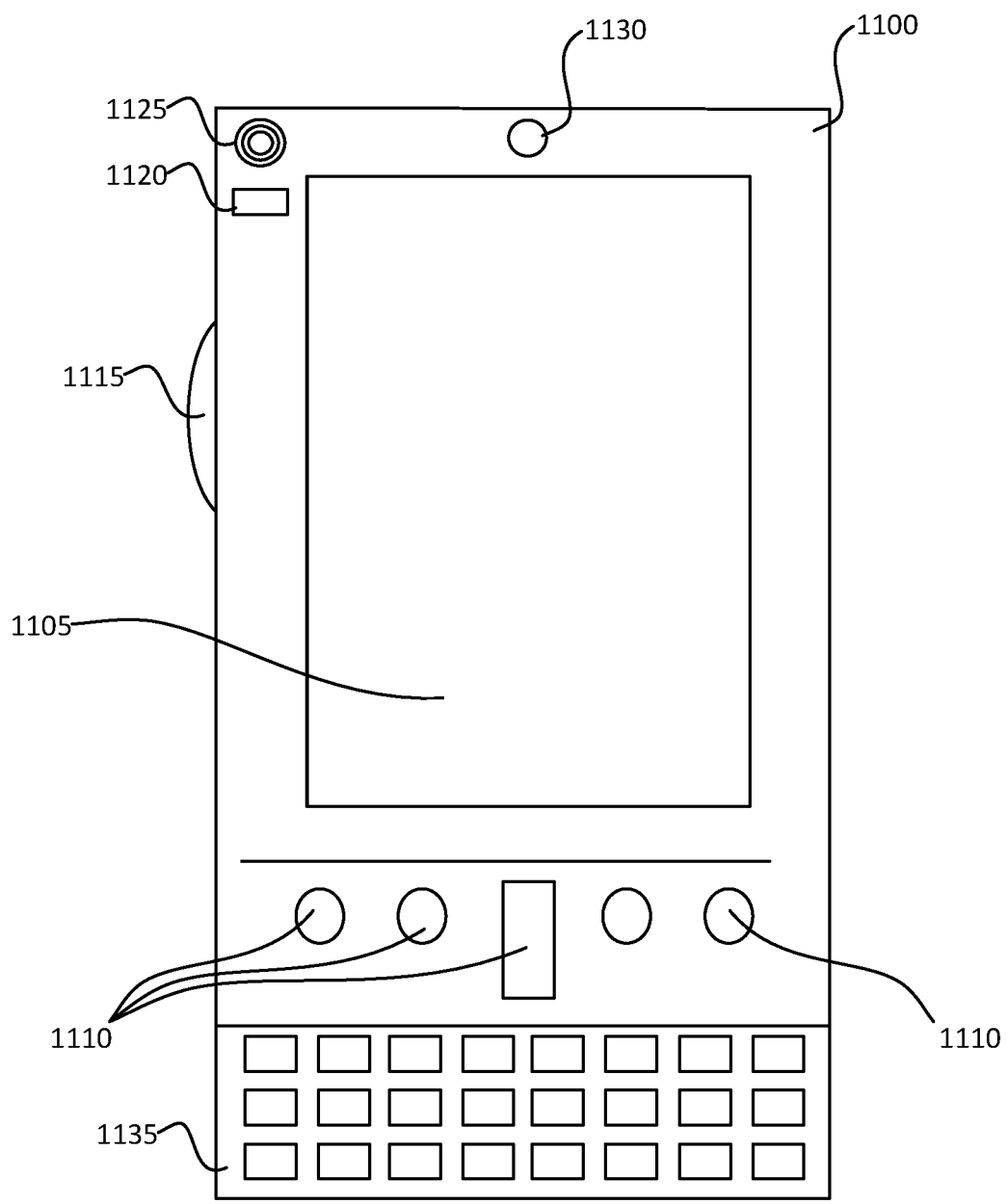
FIG. 11A is a simplified block diagram of a computing device with which aspects of the present disclosure may be practiced.
Figure 11B:
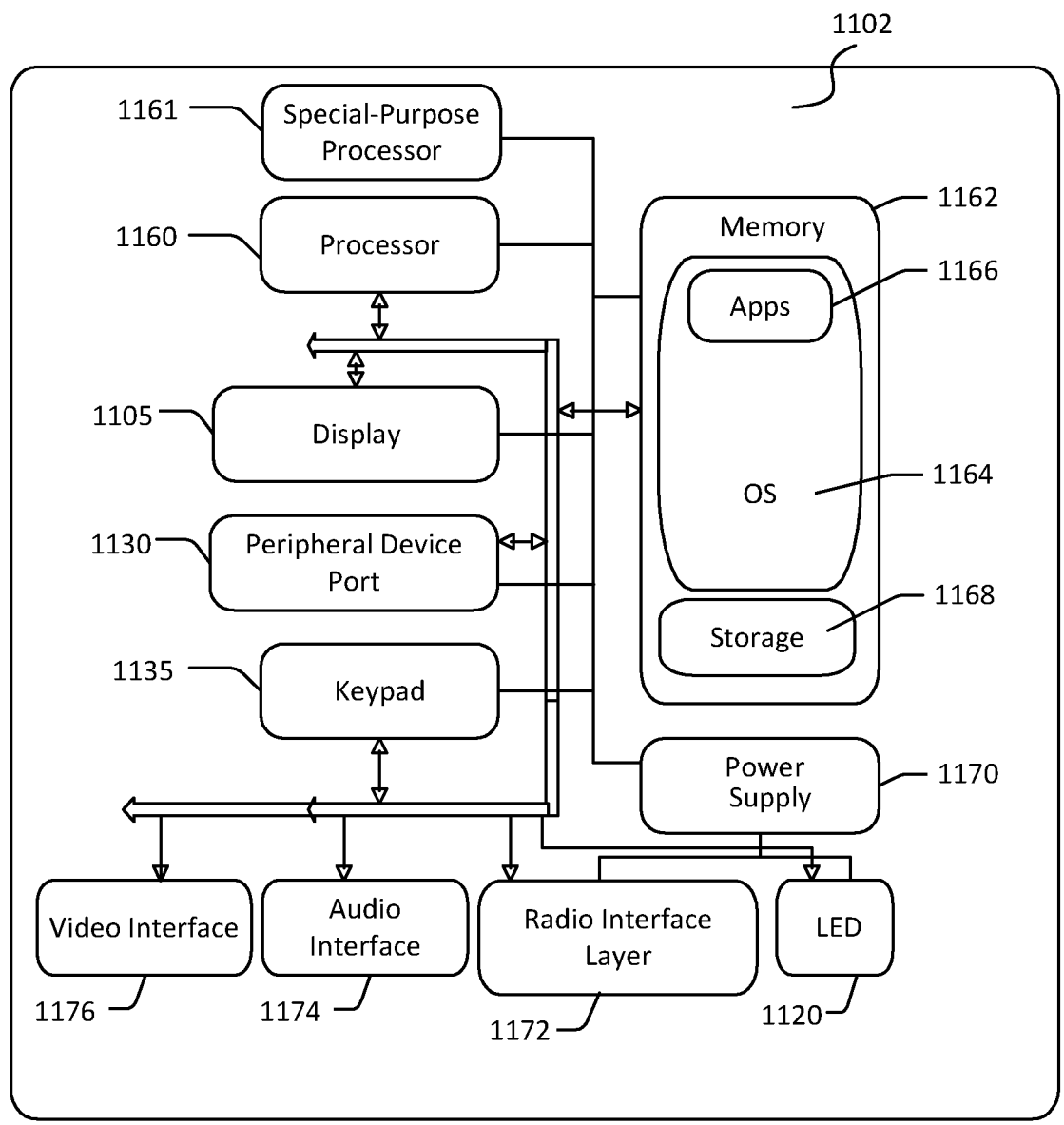
FIG. 11B is another are simplified block diagram of a mobile computing device with which aspects of the present disclosure may be practiced.
Figure 12:
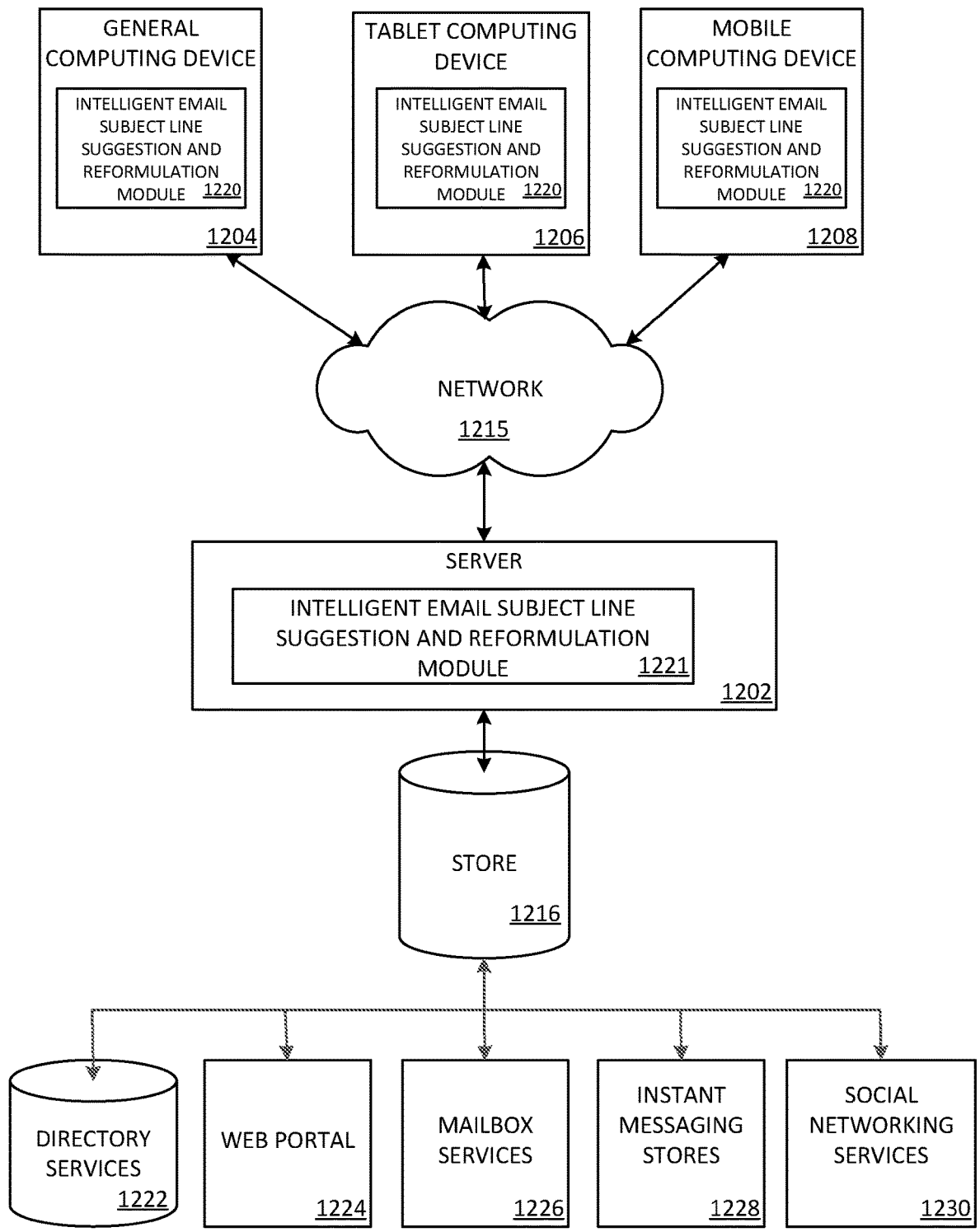
FIG. 12 is a simplified block diagram of a distributed computing system in which aspects of the present disclosure may be practiced.

FIGS. 10-12 and the associated descriptions provide a discussion of a variety of operating environments in which aspects of the disclosure may be practiced. However, the devices and systems illustrated and discussed with respect to FIGS. 10-12 are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for the computing devices described above. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as one or more components supported by the systems described herein. As examples, system memory 1004 may store the intelligent email subject line suggestion and reformulation module 1024. The operating system 1005, for example, may be suitable for controlling the operation of the computing device 1000.

Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the at least one processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display).

If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments.

In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display.

In various embodiments, the output elements include the display 1105 for showing a graphical user interface (GUI), a visual indicator 820 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230.

An Intelligent Email Subject Line Suggestion and Reformulation Module 1220 may be employed by a client that communicates with server device 1202, and/or the Intelligent Email Subject Line Suggestion and Reformulation Module 1221 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

FIG. 12 illustrates an exemplary mobile computing device 1200 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In accordance with at least one example, a system including a processor and memory is provided. The memory may store instructions that, when executed by the processor, cause the system to perform a set of operations. The set of operations may include receiving content corresponding to one or more portions of an email, determining, based on the one or more portions of the email, one or more email topics, determining, based on the one or more portions of the email, at least one intent of the email, formulating a subject line suggestion based on the one or more email topics and the at least one intent of the email, and causing the subject line suggestion to be output to a display device. At least one aspect of the above example includes where determining the one or more email topics includes comparing the content to a plurality of emails sent by a user to identify portions common to the received content and at least one email of the plurality of emails, removing the common portions from the received content, and generating a plurality of topic vectors based on the content remaining after removing the common portions. At least one aspect of the above example includes where the set of operations includes ranking each topic vector of the plurality of topic vectors based on a similarity to one or more topic vectors provided from a corpus of email, and formulating the subject line suggestion based on a topic vector and ranking. At least one aspect of the above example includes where the intent is at least one of a question, an action, a request for time, or a request for information. At least one aspect of the above example includes where the one or more portions of the email include the subject line. At least one aspect of the above example includes where the set of operations includes: selecting a subject line template based on the determined intent of the email, and populating one or more slots of the template utilizing the determined one or more email topics to generate the subject line suggestion. At least one aspect of the above example includes where the set of operations includes: identifying an email sent by a user that is similar to the received content corresponding to one or more portions of the email, extracting a subject line as a subject line suggestion from the email sent by the user, and updating one or more topics of the subject line suggestions utilizing one or more email topics. At least one aspect of the above example includes where the set of operations includes replacing an existing subject line of the email with the subject line suggestion.

In accordance with at least one example, a method is provided. The method may include receiving content corresponding to one or more portions of an email, determining, based on a first portion of content of the one or more portions of the email, one or more email topics, determining, based on a second portion of content of the one or more portions of the email, at least one intent of the email, formulating a subject line suggestion based on the one or more email topics and the at least one intent of the email, and causing the subject line suggestion to be output to a display device. At least one aspect of the above method may include where determining the one or more email topics includes comparing the first portion of content to a plurality of emails sent by a user to identify portions common to the received first portion of content and at least one email of the plurality of emails, removing the common portions from the received first portion of content; and generating a plurality of topic vectors based on the first portion of content remaining after removing the common portions. At least one aspect of the above method may include ranking each topic vector of the plurality of topic vectors based on a similarity to one or more topic vectors provided from a corpus of email, and formulating the subject line suggestion based on a topic vector and ranking. At least one aspect of the above method may include where the intent is at least one of a question, an action, a request for time, or a request for information. At least one aspect of the above method may include where the one or more portions of the email include the subject line. At least one aspect of the above method may include selecting a subject line template based on the determined intent of the email, and populating one or more slots of the template utilizing the determined one or more email topics to generate the subject line suggestion. At least one aspect of the above method may include identifying an email sent by a user that is similar to the second portion of content of the one or more portions of the email, extracting a subject line from the email sent by the user as a subject line suggestion from the email sent by the user, and updating one or more topics of the subject line suggestion utilizing the one or more email topics. At least one aspect of the above method may include receiving content corresponding to one or more portions of an email in response to receiving an indication that a user is composing an email. At least one aspect of the above method may include replacing an existing subject line of the email with the subject line suggestion.

In accordance with at least one example, a method is provided. The method may include receiving content corresponding to one or more portions of an email, identifying an email sent by the user that includes content similar to a first portion of content of the one or more portions of the email, extracting a subject line from the email sent by the user as a subject line suggestion, updating one or more topics of the subject line suggestion, and causing the subject line suggestion to be output to a display device. At least one aspect of the above example may include determining, based on a first portion of content corresponding to one or more portions of the email, one or more email topics, and updating the subject line suggestion based on the determined one or more topics. At least one aspect of the above example includes replacing an existing subject line of the email with the subject line suggestion.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
  a processor; and
  memory storing instructions that, when executed by the processor, cause the system to perform a set of operations, the set of operations comprising:
    receiving content corresponding to one or more portions of a current email being composed by a user;
    parsing the received content corresponding to the one or more portions of the current email to identify one or more email topics;
    evaluating the one or more email topics to determine an intent of the current email, wherein the determined intent is associated with one of a request, a question, a statement, or an action;
    matching, to the determined intent, a one or more templates comprising a plurality of slots customized for formulating a subject line suggestion for the one of the request, the question, the statement, or the action, wherein contents of the plurality of slots are generated based on the identified one or more email topics;
    formulating the subject line suggestion by populating at least one slot of the selected template with at least one email topic of the one or more email topics related to the determined intent;
    wherein determining the one or more email topics further comprising:
    comparing the received content to content of a plurality of previous emails to identify common content
    identify other, non-common content in the previous emails containing common content and
    generating a plurality of additional topic vectors based on common content providing a plurality of key terms to the plurality of topic vectors to determine an order of a plurality of combinations of the plurality of topic vectors and provide a highest ordered vector to the subject line suggestion; and
  causing the subject line suggestion to be output to a display device.

2. The system according to claim 1, wherein the set of operations includes:
  ranking each topic vector of the plurality of topic vectors based on a similarity to one or more topic vectors provided from a corpus of previous emails; and
  formulating the subject line suggestion based on populating the selected template with a topic vector having a higher ranking than other topic vectors of the plurality of topic vectors.

3. The system according to claim 1, wherein the determined intent is a request for time or a request for information.

4. The system according to claim 1, wherein the one or more portions of the current email include the subject line.

5. The system according to claim 1, wherein the set of operations includes:
  identifying content of a previous email that is similar to the received content corresponding to the one or more portions of the current email;
  extracting a subject line from the previous email as an email topic; and
  updating at least one slot of the selected template with the email topic including the extracted subject line.

6. The system according to claim 1, wherein the set of operations includes replacing an existing subject line of the current email with the subject line suggestion.

7. The system of claim 1, wherein formulating an updated subject line suggestion upon detection of changes to the one or more portions of the current email.

8. A method comprising:
  receiving content corresponding to one or more portions of a current email being composed by a user;
  parsing a first portion of the received content to identify one or more email topics of the current email;
  determining, based on a second portion of the received content an intent of the current email, wherein the determined intent is associated with one of a request, a question, a statement, or an action;
  matching, to the determined intent, a one or more templates comprising a plurality of slots customized for formulating a subject line suggestion for the one of the request, the question, the statement, or the action, wherein contents of the plurality of slots are generated based on the identified one or more email topics;
  formulating the subject line suggestion by populating at least one slot of the selected template with at least one email topic of the one or more email topics that is related to the determined intent;
  wherein determining the one or more email topics further comprising:
  comparing the first portion of the received content to content of a plurality of previous emails to identify common content
  identify other, non-common content in the plurality of previous emails containing common content;
  generating a plurality of topic vectors based on common content of the first portion of the received content;

providing a plurality of key terms to the plurality of topic vectors to determine an order of a plurality of combinations of the plurality of topic vectors and provide a highest ordered vector to the subject line suggestion; and causing the subject line suggestion to be output to a display device.

9. The method according to claim 8, further comprising:
ranking each topic vector of the plurality of topic vectors based on a similarity to one or more topic vectors provided from a corpus of previous emails; and
formulating the subject line suggestion based on populating the selected template with a topic vector having a higher ranking than other topic vectors of the plurality of topic vectors.

10. The method according to claim 8, wherein the determined intent is a request for time or a request for information.

11. The method according to claim 8, wherein the one or more portions of the current email include the subject line.

12. The method according to claim 8, further comprising:
identifying content of a previous email that is similar to the second portion of content of the current email;
extracting a subject line from the previous email as an extracted email topic of the previous email; and
updating at least one slot of the selected template with the extracted email topic of the previous email.

13. The method according to claim 8, further comprising receiving the content corresponding to the one or more portions of the current email in response to receiving an indication that the user is composing the current email.

14. The method according to claim 8, further comprising replacing an existing subject line of the current email with the subject line suggestion.

15. A method comprising:
receiving content corresponding to one or more portions of a current email being composed by a user;
parsing a first portion of the received content to identify one or more email topics of the current email;
determining, based on a second portion of the received content an intent of the current email, wherein the determined intent is associated with one of a request, a question, a statement, or an action;
matching, to the determined intent, a one or more templates comprising a plurality of slots customized for formulating a subject line suggestion for the one of the request, the question, the statement, or the action, wherein contents of the plurality of slots are generated based on the identified one or more email topics;
identifying a previous email sent by the user that includes similar content to the first portion of the received content of the current email;
extracting a subject line from the previous email sent by the user as an extracted email topic of the previous email;
updating the one or more email topics of the current email with the extracted email topic of the previous email;
formulating the subject line suggestion by populating at least one slot of the one or more slots of the selected template with the extracted email topic of the previous email;
wherein determining the one or more email topics further comprising:
comparing the first portion of the received content to content of a plurality of previous emails to identify common content;
identify other, non-common content in the plurality of previous emails containing common content
generating a plurality of topic vectors based on common content of the first portion of the received content:
providing a plurality of key terms to the plurality of topic vectors to determine an order of a plurality of combinations of the plurality of topic vectors and provide a highest ordered vector to the subject line suggestion; and
causing the subject line suggestion to be output to a display device.

16. The method of claim 15, further comprising replacing an existing subject line of the current email with the subject line suggestion.

17. The method of claim 15, wherein the determined intent is a request for time or a request for information.

18. The method of claim 15, further comprising:
ranking each topic vector of the plurality of topic vectors based on a similarity to one or more topic vectors provided from a corpus of previous emails; and
formulating the subject line suggestion based on populating the selected template with a topic vector having a higher ranking than other topic vectors of the plurality of topic vectors.

* * * * *